US006647723B1

(12) United States Patent
Sun et al.

(10) Patent No.: US 6,647,723 B1
(45) Date of Patent: Nov. 18, 2003

(54) CONTROL STRATEGY FOR COUNTERACTING INCIPIENT TURBOCHARGER SURGING USING A VARIABLE VALVE ACTUATION MECHANISM FOR THROUGH-CYLINDER BLEED

(75) Inventors: Jinhui Sun, Bloomington, IL (US); Xinqun Gui, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/224,132

(22) Filed: Aug. 20, 2002

(51) Int. Cl.$^7$ ............................................... F02D 23/00
(52) U.S. Cl. ........................... 60/601; 60/605.1; 60/611
(58) Field of Search ........................... 60/601, 602, 603, 60/605.1, 611; 123/90.15

(56) References Cited

U.S. PATENT DOCUMENTS

| | | | | |
|---|---|---|---|---|
| 4,612,770 A | * | 9/1986 | Tadokoro et al. | 60/602 |
| 4,932,372 A | * | 6/1990 | Meneely | 123/182.1 |
| 6,354,268 B1 | * | 3/2002 | Beck et al. | 123/435 |
| 6,418,720 B1 | * | 7/2002 | Cornell et al. | 60/602 |
| 6,434,938 B1 | | 8/2002 | Sun et al. | |

* cited by examiner

Primary Examiner—Hoang Nguyen
(74) Attorney, Agent, or Firm—Dennis Kelly Sullivan; Susan L. Lukasik; Jeffrey P. Calfa (57) ABSTRACT

A turbocharger (32) creates intake manifold boost for a diesel engine (10) that has a variable valve actuation mechanism. At times, exhaust valve opening (EVO) is increasingly retarded in relation to the engine operating cycle (56) to cause the turbocharger to increase boost, engine fueling is also increased in relation to the increased boost (58), and in response to any incipient surging of the compressor resulting from such increasingly retarded exhaust valve opening and such increased engine fueling, compressed charge air is bled from the intake manifold through the combustion chambers to the exhaust system (62) to counter the incipient surging and thereby avoid any significant turbocharger surge. The bleeding is accomplished by keeping the exhaust valves (24) slightly open beyond the time that they would otherwise close.

21 Claims, 8 Drawing Sheets

CONTROL STRATEGY FOR COUNTERACTING INCIPIENT TURBOCHARGER SURGING USING A VARIABLE VALVE ACTUATION MECHANISM FOR THROUGH-CYLINDER BLEED

FIELD OF THE INVENTION

This invention relates generally to turbocharged diesel engines that propel motor vehicles and are equipped with a variable valve actuation mechanism that can vary the timing of engine valve opening, and in particular to a control strategy for increasing engine torque without undesirable consequences on tailpipe emissions, such as diesel engine exhaust smoke, especially at lower engine speeds where turbocharger boost is relatively low.

BACKGROUND AND SUMMARY OF THE INVENTION

A turbocharger is one type of device that is used to supercharge an internal combustion engine. A diesel engine that is supercharged by a turbocharger is sometimes referred to as a turbocharged diesel. A turbocharger comprises a turbine that is powered by engine exhaust gas and coupled by a shaft to operate a compressor that boosts pressure in the engine air intake system downstream of the compressor. Boost is controlled by controlling turbine operation.

A strategy for controlling turbine operation needs to consider the particular type of turbocharger. One type of turbocharger has a variable geometry, or variable nozzle, that is capable of changing the manner in which exhaust gas that flows through the turbocharger interacts with the turbine. Movable vanes are selectively positioned to control the nature of exhaust gas interaction with the turbine, and hence control boost. The turbocharger includes an electromechanical actuator for interfacing an electric control with the movable vanes. That actuator comprises a solenoid for setting vane position according to a control signal from the electric control. The control signal is developed according to a desired control strategy.

A waste-gate type turbocharger controls the proportion of exhaust gas that is allowed to interact with the turbine by controlling the extent to which a waste gate valve that diverts exhaust gas from the turbine is allowed to open. The waste gate valve may be operated by an electric actuator to which a control signal is applied.

It is believed fair to say that a turbocharger is generally considered to be a device for improving engine performance. A turbocharger is typically designed for higher engine speeds, because the amount of engine exhaust that is available to act on a turbine of a turbocharger at low engine speeds is usually insufficient for the turbocharger compressor to develop sufficient boost to render it effective in contributing to improved performance at those low speeds.

It has been discovered however that certain turbocharged diesel engines, especially engines that have a variable valve actuation mechanism that can vary engine valve timing, can develop increased low speed torque without undesirable consequences on tailpipe emissions, such as smoke in the engine exhaust. This improvement is achieved by certain conjunctive control of: 1) time at which the engine exhaust valves open during an engine operating cycle and 2) engine fueling. In general, the conjunctive control comprises retarding, i.e. delaying, the opening of the exhaust valves while increasing the fueling to maintain a desired air-fuel ratio in the combustion chambers. The improvement can provide a significant increase in engine torque during low speed operation of the engine without significant adverse effect on tailpipe emissions.

The process of exhausting products of combustion from a combustion chamber of a diesel engine may be considered to comprise two phases: 1) a blow-down phase where the exhaust gas pressure is large enough to induce exhaust gas flow through an open exhaust valve; and 2) a pump-out phase where the moving engine mechanism is reducing the swept volume of the combustion space to an extent that forces exhaust gases out through the open exhaust valve. The blow-down phase will commence immediately upon opening the exhaust valve while the pump-out phase will occur later. For example, if the exhaust valve for an engine cylinder is opened as a piston is completing a power downstroke within the cylinder in advance of the piston's arrival at bottom dead center (BDC), the blow-down phase will commence in advance of BDC. It may also continue into the ensuing exhaust upstroke of the piston until the pressure drops to an extent insufficient to induce continued exhaust flow or until the upstroking piston has reduced the swept volume sufficiently to create pressure that forces the exhaust gases out through the open exhaust valve. Testing has shown that retarding the timing of exhaust valve opening can create more effective exhaust blow-down that is beneficial to turbocharger operation, particularly at low engine speeds where a turbocharger may have heretofore been considered relatively ineffective in improving engine performance.

Because certain principles of the present invention include changing the time in the engine operating cycle when the exhaust valves open, the engine must have an appropriate variable valve actuation mechanism for the exhaust valves. An example of such a mechanism comprises an electric actuator for opening and closing each exhaust valve in accordance with an electric signal applied to the actuator. Such an engine is sometimes referred to as a camless engine, particularly where the timing of the engine intake valves is also controlled by electric actuators. When the inventive strategy is invoked, the timing of the opening of each exhaust valve during the engine cycle is increasingly retarded.

By retarding exhaust valve opening, the in-cylinder burning time for particulates is increased, and this reduces particulate emission. Retarding the exhaust valve opening has also been discovered to provide increased energy input to the turbocharger compressor, thereby increasing boost, and it is believed that this discovery is a departure from presently prevailing knowledge. As boost increases and smoke decreases, engine fueling is also increased to develop increased engine torque so that the additional fueling is not adverse to tailpipe emissions in any significant way. In this way, the turbocharger is forced toward operating at its performance limit, thereby enabling the engine to develop a corresponding torque that is greater than the torque that would otherwise be achieved.

The consequence of retarding exhaust valve opening in conjunction with increasing engine fueling may however affect turbocharger operation. One possible consequence is undesirable surging of the turbocharger compressor that may occur should the exhaust flow acting on the turbine force the turbocharger to operate beyond its performance limit. In order to avoid such surging, a bleed valve at the compressor outlet operates at, or in anticipation of, incipient compressor surging to bleed compressed charge air from the intake system sufficiently to counteract, or prevent, the incipient surging. The compressed charge air is bled from the intake system in a manner that allows intake manifold pressure to increase without turbocharger surging. Because of this ability to achieve increased intake manifold pressure without accompanying turbocharger surging, the turbocharger is enabled to operate at or near its performance limit, even during low-speed engine operation, and in addition, the basic construction of the turbocharger, which is typically designed with high speed, rather than low speed, operation in mind, does not have to be modified or altered in order to implement principles of the present invention in an engine. Co-pending patent application Ser. No. 09/906,487, filed Jul. 16, 2001, discloses an electric-operated bleed valve associated with the engine intake system for bleeding compressed charge air from the intake system to counteract incipient compressor surging.

The invention of that the co-pending patent application relates to a strategy for controlling exhaust valve opening in a turbo-diesel engine that has a variable valve actuation mechanism. When the engine is running at less than peak torque speed, the engine control system causes the exhaust valves to open at a later time during the engine cycle than they would in an engine that has a camshaft operating the exhaust valves. The extent to which the control system retards exhaust valve opening is a function of one or more selected variables, such as engine speed, engine load, boost, brake specific fuel consumption (BSFC), and vehicle acceleration. The strategy is implemented via a processor-based engine control and utilizes data relating to certain engine operating parameters to control the bleed of compressed charge air from the engine intake system. The data is processed according to a software algorithm that is executed by the processor to develop data for a control signal that is applied to the bleed valve at the outlet of the compressor of the turbocharger. The controlled bleeding counters any incipient surging of the turbocharger resulting from increasingly retarding the timing of exhaust valve opening and accompanying increased fueling.

In one respect the present invention relates to a further improvement in that strategy that enables the bleed valve to be eliminated. Rather than adding a bleed valve for suppressing compressor surging, air is allowed to pass through the engine itself by operating the variable valve actuation mechanism to cause the exhaust valves to be open during intake portions of the engine cycle when the intake valves are open. The open exhaust valves have a suitable amount of lift and are kept open for a suitable amount of time to counteract incipient compressor surging whenever incipient surging is detected.

One general aspect of the claimed invention relates to an internal combustion engine comprising an intake system through which charge air is delivered to an intake manifold of the engine, including a turbocharger that comprises a compressor operated by exhaust gases from the engine for creating compressed charge air that provides boost in the intake manifold. A control controls the opening of engine exhaust valves in relation to an engine operating cycle and the fueling of the engine in relation to the engine operating cycle. At times, the control increasingly retards exhaust valve opening in relation to the engine operating cycle to cause the turbocharger to increase intake manifold pressure, increases engine fueling in relation to the increased intake manifold pressure, and in response to any incipient surging of the compressor resulting from the effect on engine exhaust gases of such increasingly retarded exhaust valve opening and such increased engine fueling, causes the exhaust valves to be open, during at least some portion of the time that engine intake valves are open, for bleeding a sufficient amount of charge air through the combustion chambers to the exhaust system to counteract incipient compressor surging.

Another general aspect of the claimed invention relates a method for an engine as just described wherein at times, exhaust valve opening is increasingly retarded in relation to the engine operating cycle to cause the turbocharger to increase intake manifold pressure, engine fueling is increased in relation to the increased intake manifold pressure, and in response to any incipient surging of the compressor resulting from the effect on engine exhaust gases of such increasingly retarded exhaust valve opening and such increased engine fueling, causing the exhaust valves to be open, during at least some portion of the time that the intake valves are open, for bleeding a sufficient amount of charge air through the combustion chambers to the exhaust system to counteract incipient compressor surging.

Further aspects of the claimed invention relate to details of the control strategy embodied in a software algorithm in the engine control processor for accomplishing the method just described, and to details of the way in which the engine valves are controlled.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
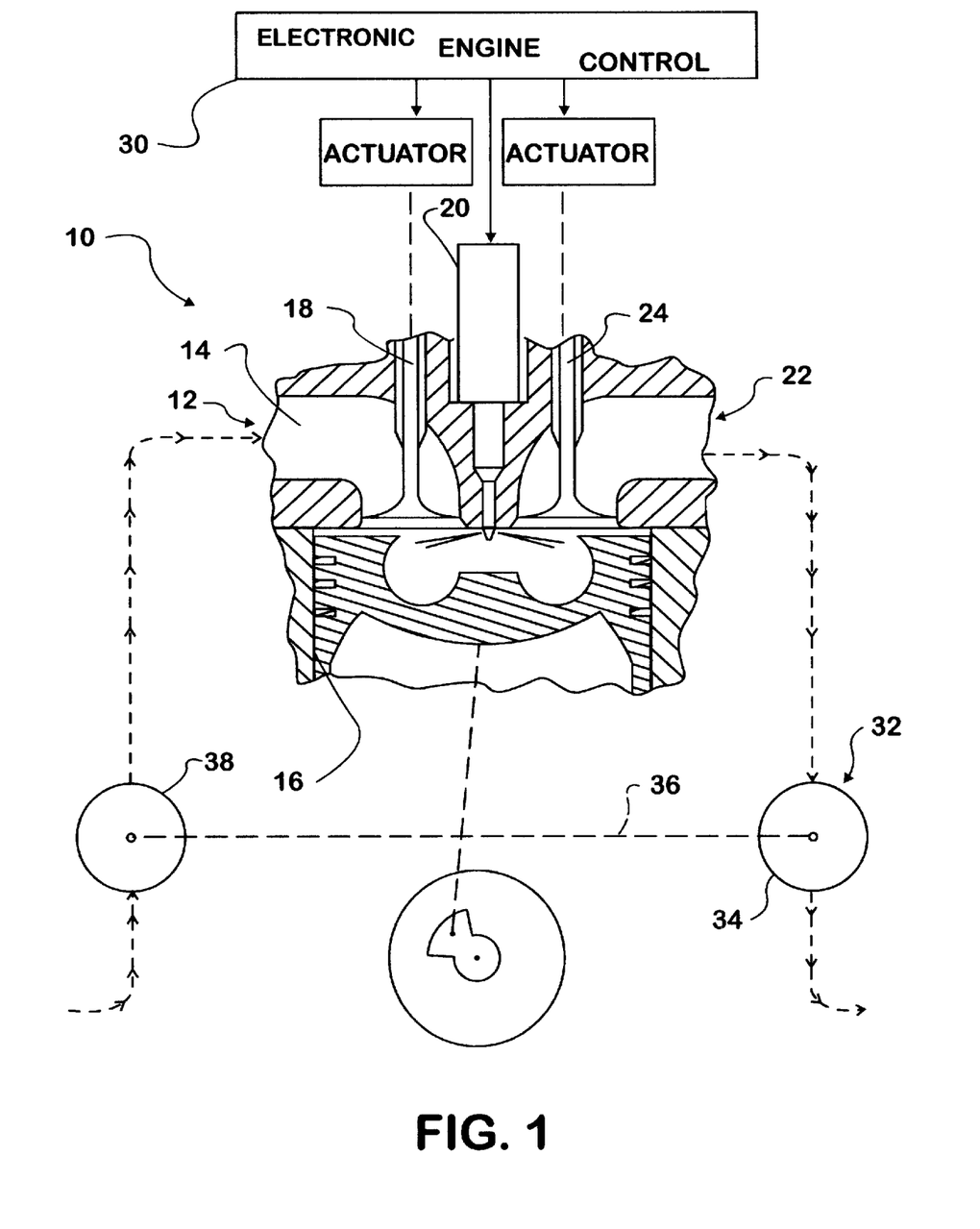
FIG. 1 is a general schematic diagram of an engine, in accordance with principles of the present invention.

FIG. 1 illustrates an internal combustion engine 10 that powers a motor vehicle. An example of such a vehicle is a truck having a chassis containing a powertrain in which engine 10 is a fuel-injected turbocharged diesel engine operatively coupled through a drivetrain to driven wheels for propelling the vehicle. The engine has a variable valve actuation mechanism that allows the time of intake valve opening and exhaust valve opening to be controlled according to engine operation.

Engine 10 comprises an intake system 12 through which charge air is delivered to an intake manifold 14 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24.

Engine 10 is a camless engine, meaning one where each of the normally closed intake and exhaust valves is opened at the proper time in the engine operating cycle by applying an electric signal to a respective electric actuator of the variable valve actuation mechanism.

An electronic engine control 30 that possesses digital processing capability is associated with engine 10. Control 30 may comprise one or more processors that process data from various input data signal sources in accordance with programmed algorithms to develop certain data for signals used in the performance of various functions associated with operation of engine 10. The data processed by control 30 may originate at external sources (input variables) and/or be generated internally of control 30 (local variables). Control 30 develops the data for the signals that operate the intake and exhaust valve actuators and for the signals that operate fuel injectors 20.

Turbocharging of engine 10 is accomplished by a turbocharger 32 which comprises a turbine 34 connected in exhaust system 22 coupled via a shaft 36 to a compressor 38 connected in intake system 12. Compressor 38 is operated by exhaust gases from engine 10 that act on turbine 34 to create compressed charge air that provides boost in intake manifold 14.

Engine control 30 contains a software program that implements an algorithm for control of various engine functions including control of engine fueling via fuel injectors 20 and control of intake valves 18 and exhaust valves 24. That algorithm is presented in FIG. 2 where it is designated by the reference numeral 50.

Figure 2:
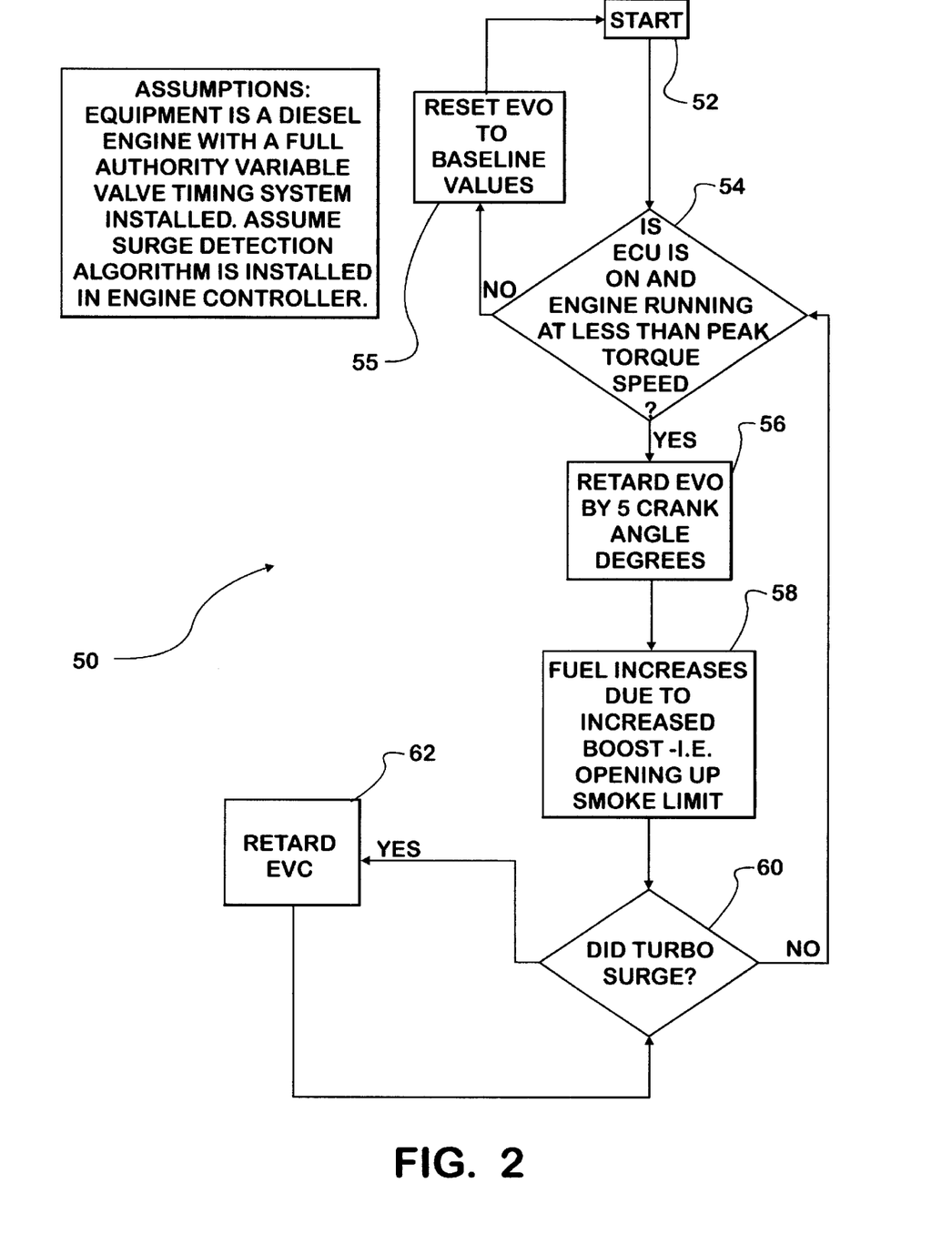
FIG. 2 is a flow diagram of an algorithm used in practicing the invention.

When algorithm 50 is executed, it performs a series of steps designated by the general reference numeral 50, the first of which is a start step 52. Once the start step has concluded and the engine has started, a subsequent step 54 determines a) if the control 30 (ECU) is on, i.e. powered up and running, and b) if the engine is running at a speed less than peak torque speed. If these two conditions a) and b) are not satisfied, then the timing of exhaust valve opening is reset to a baseline value (step 55), after which steps 52 and 54 repeat. When the two conditions a) and b) are satisfied, then step 56 causes the ECU to retard the timing of the opening of exhaust valves 24 in relation to the base line timing value. In the example of algorithm 50, exhaust valve opening is retarded by an additional five degrees of engine crankshaft rotation from the baseline value in the engine cycle.

The next step 58 causes the control to increase engine fueling in accordance with the increased boost resulting from retarding the timing of exhaust valve opening. The increased fueling serves to maintain a desired fuel-air ratio.

The next step 60 of algorithm 50 determines if turbocharger 32 began to surge as a result of the delay in opening the exhaust valves. If the turbocharger did not begin to surge, the algorithm loops back to step 54, and if conditions a) and b) continue to be satisfied, steps 56, 58, and 60 repeat. As long as the two conditions a) and b) continue to be satisfied, exhaust valve opening is increasingly delayed by every ensuing iteration of steps 56 and 58.

Eventually however, the retardation will become enough to cause incipient turbocharger surging. Hence, when step 60 determines that turbocharger 32 is beginning to surge, control 30 then begins to control the exhaust valves in a manner that counteracts the incipient surging. This is represented by step 62 of algorithm 50.

Figure 3:
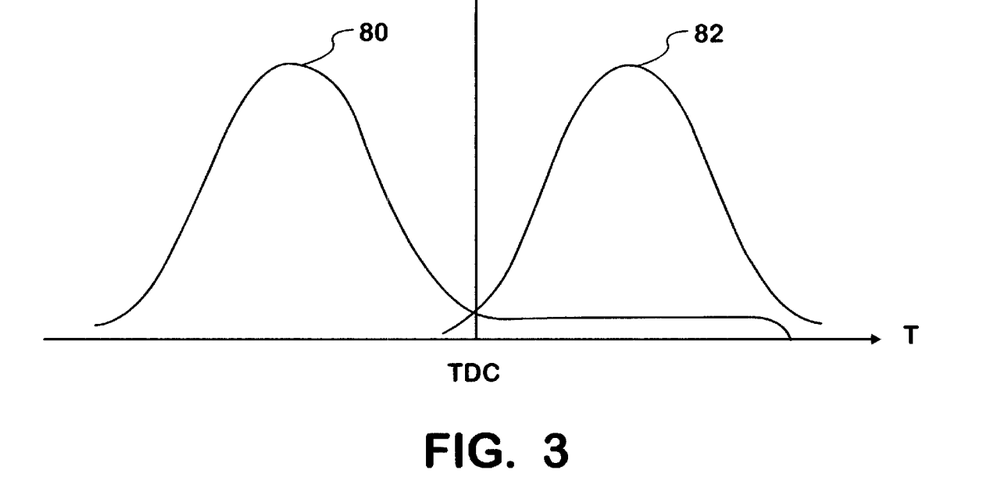
FIG. 3 is a representative timing diagram of intake and exhaust valve opening that is useful in explaining the invention.

An example of a specific control strategy is portrayed by FIG. 3. Rather than allowing exhaust valves 24 to completely close as they are in the process of closing to conclude exhaust portions of the engine cycle, their closings are delayed. The delays extend into the intake portions of the engine cycle where intake valves 18 open. The durations of the exhaust valve closing delays and the amount of exhaust valve lift during the delays are controlled in a manner that bleeds a sufficient amount of charge air from intake manifold 14 through cylinders 16 to the exhaust system to counteract the incipient compressor surging.

FIG. 3 shows the exhaust valve opening profile by the reference numeral 80 and the intake valve opening profile by the reference numeral 82. FIG. 3 shows that the control: causes the closing of the openexhaust valve to be delayed until a time later than initial opening of the intake valve; initiates the delay in exhaust valve closing as the exhaust valve is in the process of closing; and causes the exhaust valve to remain open with predetermined lift while its closing is being delayed.

After step 62 accomplishes a change in exhaust valve timing, step 60 is performed to see if the incipient surging has been successfully counteracted. If so, the algorithm reverts back to step 54. If not, it repeats step 62 making further adjustment in exhaust valve timing control toward counteracting the surging. Step 62 will continually repeat until step 60 determines that the incipient surging has been counteracted, and when such a determination has been made, the algorithm returns to step 54.

Figure 4:
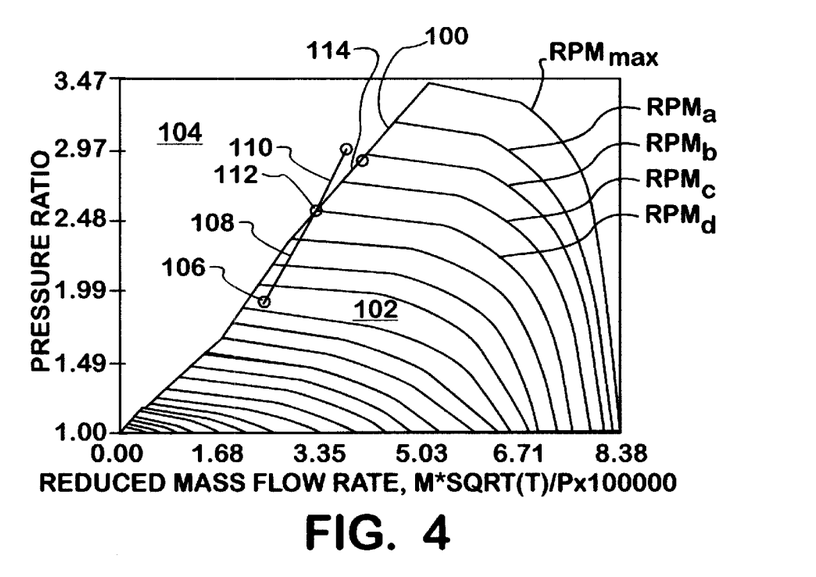
FIG. 4 is a graph plot that is useful in explaining the invention.

FIG. 4 illustrates an example of a compressor speed map for a known turbocharger. A surge line 100 divides a zone of stable turbocharger operation 102 from a zone of unstable operation 104. Within zone 102, known relationships exist between the three parameters presented, namely pressure ratio, reduced mass flow rate, and speed. Let it be assumed that the turbocharger is operating with stability at the operating point marked by the reference numeral 106. If the opening of the exhaust valves is now increasingly delayed or/and engine fueling increased beyond full load fueling, the pressure ratio will increase faster than the airflow that the engine demands. As a result the turbocharger operating point will begin to migrate along a line segment 108 from point 106 toward surge line 100. As the opening of the exhaust valves continues to be increasingly delayed or/and engine fueling continues to be increased, the engine operating point will move along a line segment 110 that crosses the surge line and enters zone 104. The turbocharger will therefore begin to surge as the operating point moves across the surge line at location 112. By bleeding some of the compressed charged air from intake system 12 through the engine, the operating point can be returned to the stable zone 102, such as along a line segment 114, instead of along line segment

110. In this way, the compressed charge air is bled from the intake system so as to further increase intake manifold pressure without compressor surge. As a result, turbocharger stability is achieved at a pressure ratio and a mass flow rate that are both increased relative to point 112.

Figure 5:
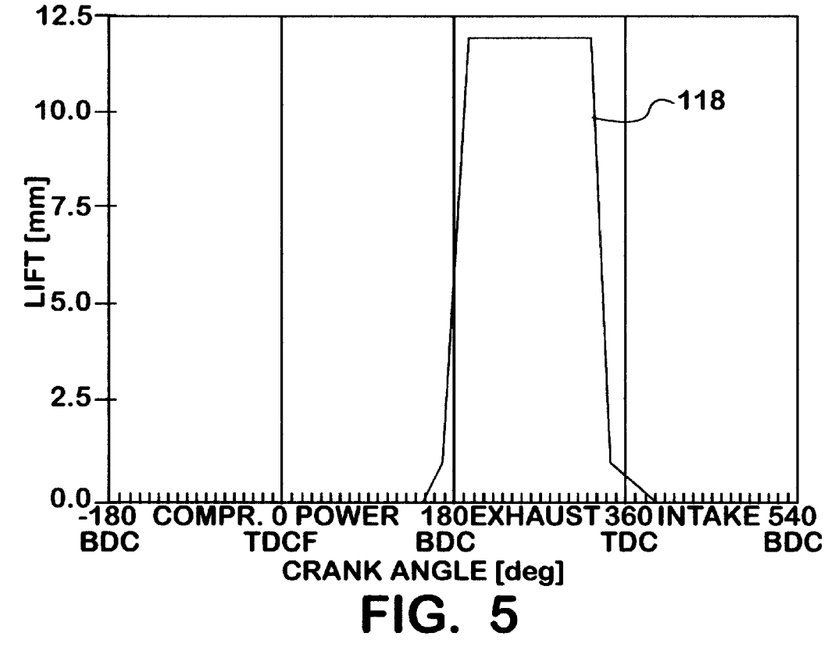
FIGS. 5–8 are timing diagrams simulating different patterns of exhaust valve opening useful in understanding additional aspects of the invention.
Figure 6:
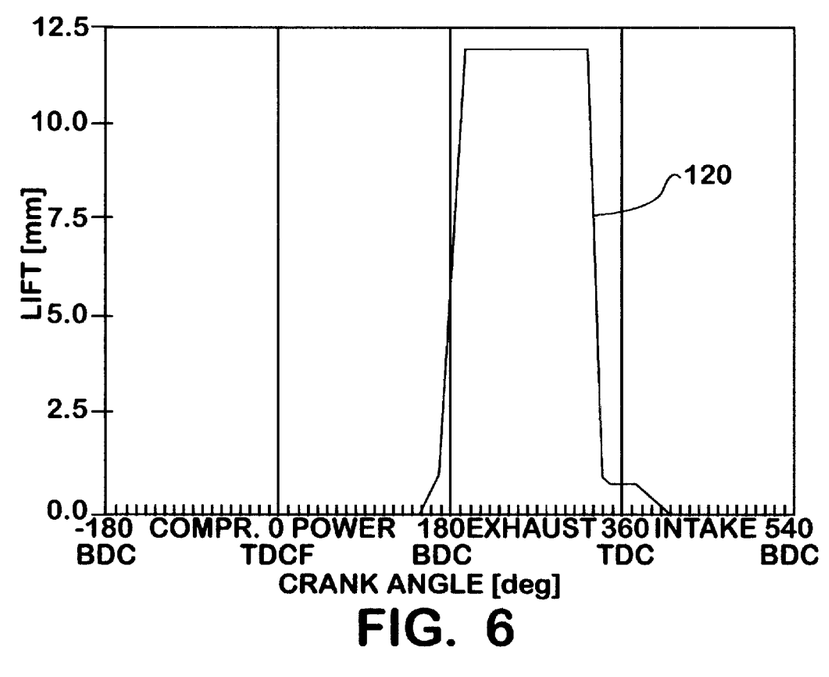
Figure 7:
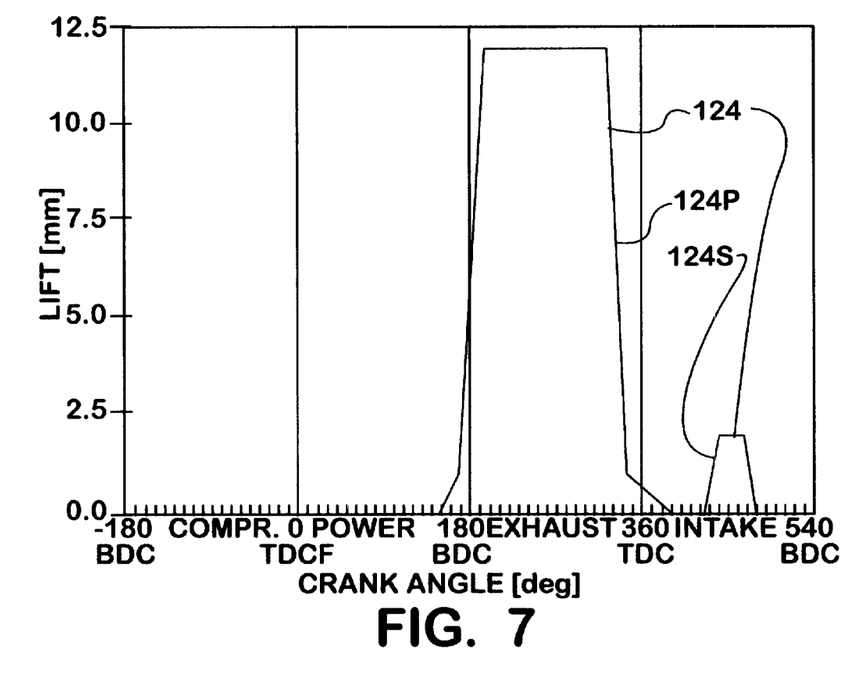
Figure 8:
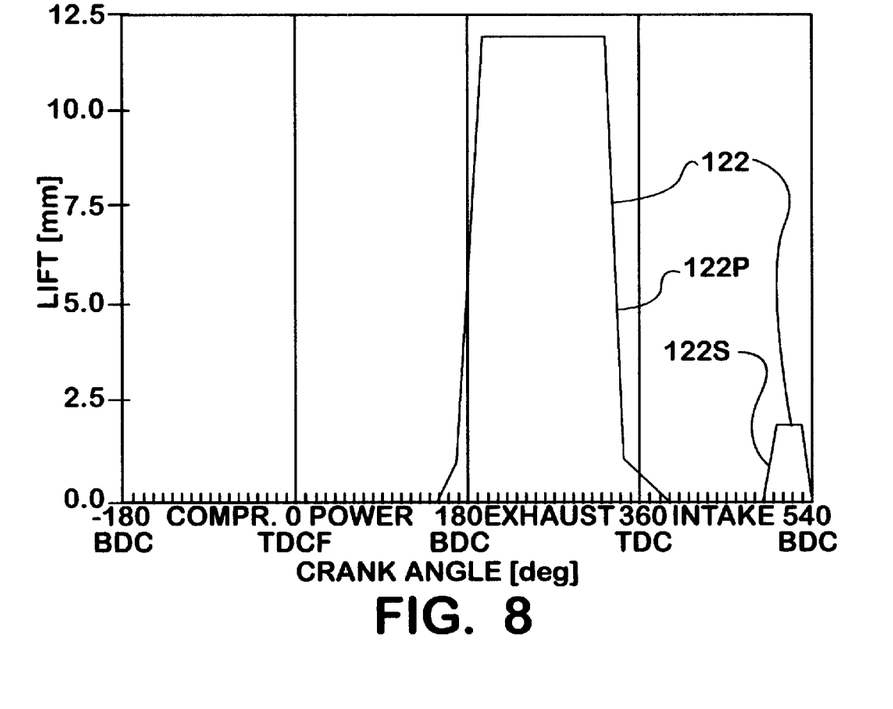

FIGS. 5–12 serve to disclose additional principles of the invention, with FIGS. 6 and 8 exemplifying certain of those principles. For reference, FIG. 5 shows a plot 118 of exhaust valve lift versus crank angle where, as described earlier, both exhaust valve opening has been retarded and engine fueling has been increased to a point of incipient compressor surging.

FIG. 6 shows a plot 120 of exhaust valve lift versus crank angle that is similar to FIG. 3 in that exhaust valve closing has been retarded, but not to the extent in FIG. 3. The exhaust valve closing has however been retarded from that of FIG. 5 so that with retarded valve opening and increased fueling, compressor surging is avoided.

FIG. 8 shows a graph plot 122 of exhaust valve lift versus crank angle having a primary opening phase 122P like plot 118 of FIG. 5, but followed by a subsequent re-opening phase 122S.

Figure 9:
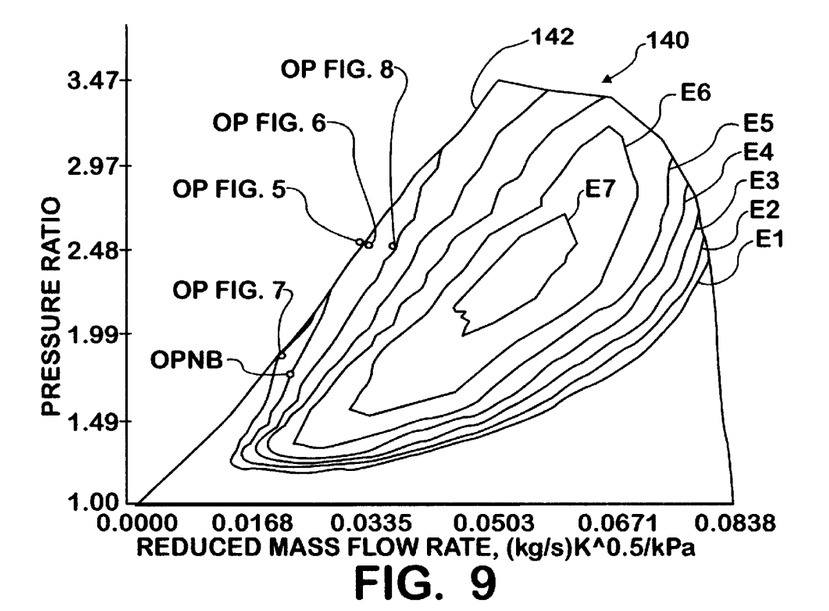
FIG. 9 is a compressor efficiency map, employing pressure ratio and reduction in mass flow rate as variables, to show various operating efficiencies of a turbocharger compressor, and also to show operating points corresponding to the simulations of FIGS. 5–8.
Figure 11:
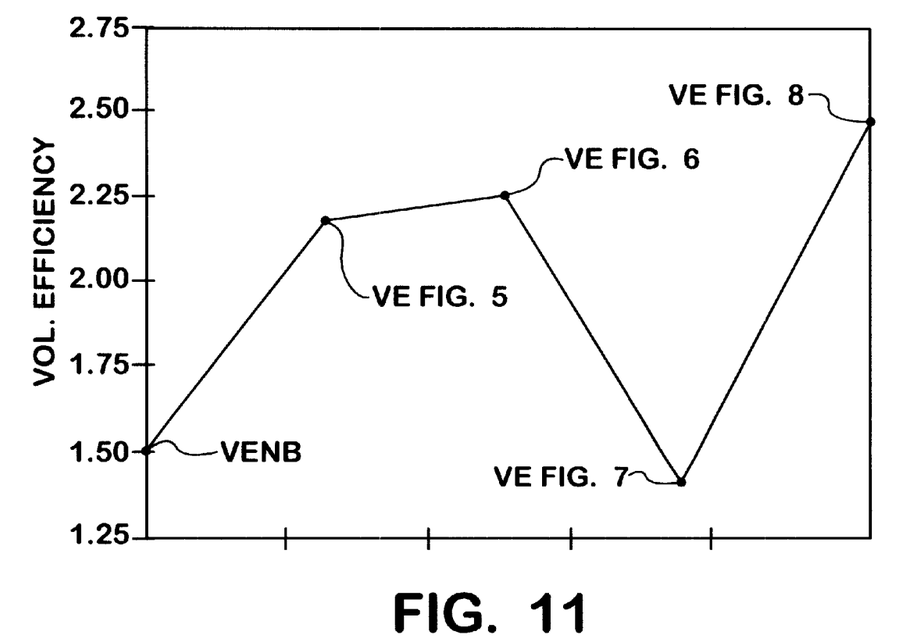
FIG. 11 is a graph plot comparing volumetric efficiencies of the compressor for the operating points.
Figure 12:
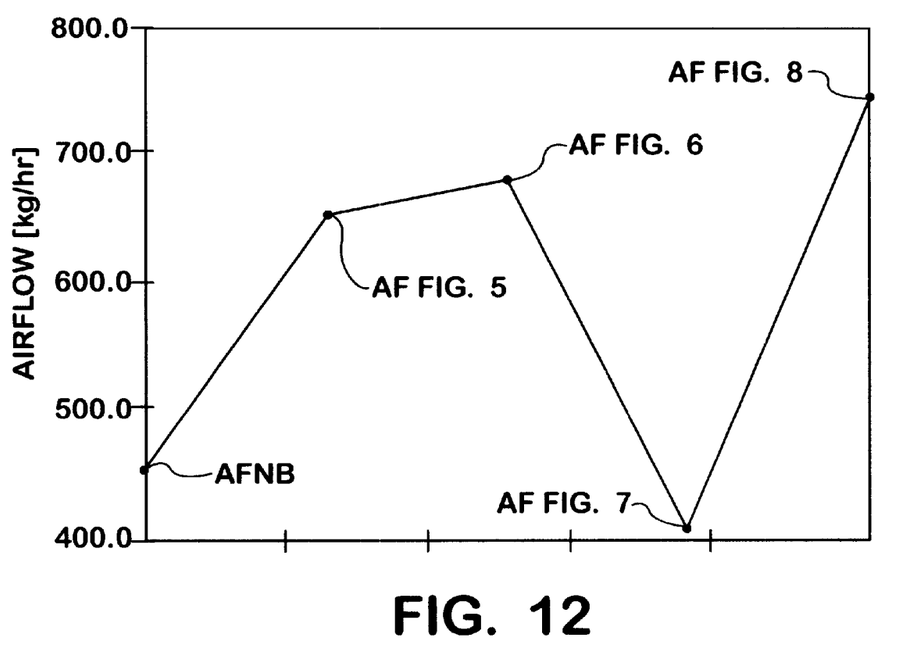
FIG. 12 is a graph plot comparing mass airflows of the compressor for the operating points.

The significance of these two examples of FIGS. 6 and 8 will be better appreciated when FIGS. 9, 11, and 12 are discussed, but before discussing those latter three Figures, FIG. 7 will be briefly described. FIG. 7 shows a graph plot 124 of exhaust valve lift versus crank angle having a primary opening phase 124P like the corresponding phase 122P of FIG. 8 and a subsequent re-opening phase 124S. Re-opening phase 124S is like re-opening phase 122S of FIG. 8 in its duration, but differs from re-opening phase 122S in that it occurs earlier in the engine cycle. Because re-opening phase 124S occurs earlier during the intake stroke than re-opening phase 122S, in-cylinder pressure has not yet increased to a pressure that is greater than exhaust pressure, and that condition is not conducive to bleeding flow from the intake, through the cylinder, to the exhaust. Moreover, exhaust backflow into the cylinder that results from earlier re-opening of the exhaust valve reduces the need for increased turbocharger flow into the cylinder, and that increases the potential for compressor surging, rather than decreasing that potential. Accordingly, a later re-opening of the exhaust valve while the intake valve is open, as in the example of FIG. 8, will tend to avoid a condition of incipient compressor surging.

FIG. 9 shows a representative compressor efficiency map 140 containing seven selected lines of operating efficiencies marked E7, E6, E5, E4, E3, E2, E1 in order of decreasing efficiency. The compressor surge line is marked by the reference numeral 142, and it demarcates a zone of stable compressor operation, generally below and to the right, i.e. a non-surge zone, from a zone of instability, generally above and to the left, i.e. a surge zone. Five operating points are marked by the references OPNB, OPFig5, OPFig6, OPFig7, and OPFig8.

Operating point OPNB marks a baseline compressor operating point at normal exhaust valve timing in the absence of both bleed and increased fueling for an example of an engine running at 1000 rpm and full load. The compressor operation is stable, and the compressor is operating at substantially E2 efficiency. This is typical of engine operation at start 52 of the algorithm of FIG. 2.

Retarding exhaust valve opening and increasing fueling in accordance with the algorithm of FIG. 2 to achieve exhaust valve opening like that shown in FIG. 5, results in the compressor operation changing, with reference to FIG. 9, from operating point OPNB to operating point OPFig5. While this change from operating point OPNB to operating point OPFig5 significantly increases the pressure ratio, accompanied by a small reduction in mass flow rate and a small increase in efficiency as the change is occurring, the direction of change on map 140 is toward surge line 142, and operating point OPFig5 is shown actually across the surge line just inside the surge zone.

Retarding exhaust valve closing in accordance with the algorithm to accomplish bleeding after valve opening has been retarded and fueling increased, as shown in FIG. 6 however, results in compressor operation at operating point OPFig6 where the pressure ratio and efficiency are similar to their counterparts at operating point OPFig5, but now clearly within the zone of stable compressor operation.

Retarding exhaust valve closing in accordance with the algorithm to accomplish bleeding after valve opening has been retarded and fueling increased, as shown in FIG. 8, places the operating point OPFig8 in the zone of stable operation even farther away from surge line 142, with a pressure ratio similar to those at operating points OPFig5 and OPFig6, and with modestly improved efficiency. Hence, the examples of FIGS. 6 and 8 are seen representative of improvement that is attainable through principles of the invention. The re-opening phase 124S is to be timed so that the rapidly changing pressure conditions favor bleeding through the cylinder from the intake to the exhaust, unlike that of the earlier re-opening phase 122S in FIG. 7.

From the foregoing, the reader may appreciate that FIG. 8 represents one of the preferred modes of operation for improving engine performance without compressor surging. Re-opening of an exhaust valve as in FIG. 8 is an operation that may perhaps be more easily performed by certain valve actuation apparatus in comparison retarding the closing as in the examples of FIGS. 2 and 6.

Figure 10:
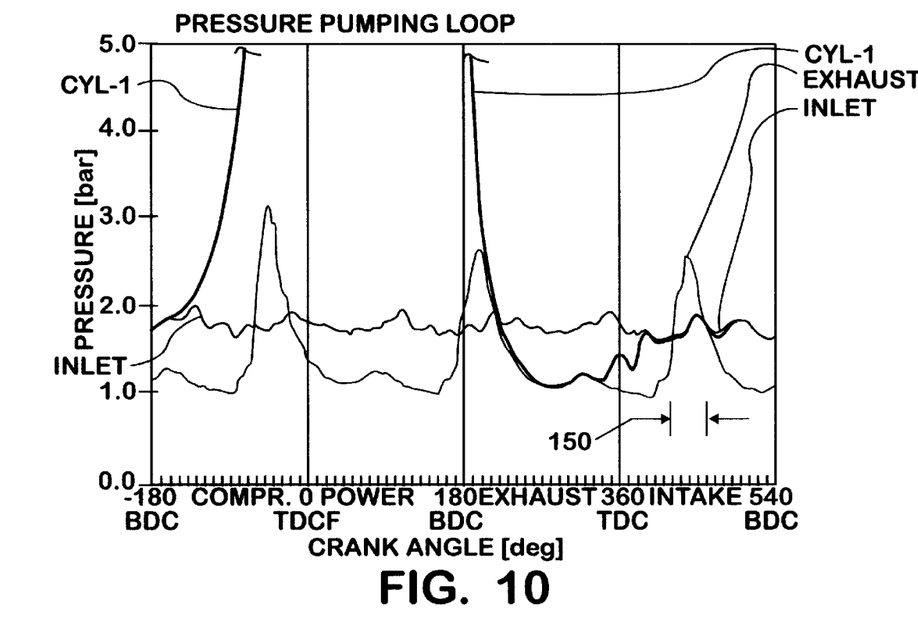
FIG. 10 is a graph plot showing in-cylinder, intake, and exhaust pressure traces corresponding to one of the operating points in FIG. 9.

FIG. 10 depicts an in-cylinder pressure trace, an exhaust pressure trace, and an intake pressure trace for a baseline condition like that of FIG. 5. During that portion of an engine cycle marked by the reference numeral 150, exhaust pressure exceeds in-cylinder pressure, and so opening the exhaust valve during that portion of the cycle would not achieve the desired through-bleed for avoiding compressor surging. Hence, FIG. 10 shows that re-opening of the exhaust valve will accomplish the through-bleed after portion 150 of the cycle.

FIG. 11 is a graph comparing compressor efficiencies for the five examples that have been given. The baseline example is marked by the reference VENB; the example of FIG. 5 is marked by the reference VEFig5; the example of FIG. 6 is marked by the reference VEFig6; the example of FIG. 7 is marked by the reference VEFig7; and the example of FIG. 8 is marked by the reference VEFig8.

FIG. 12 is a graph comparing compressor airflows for the five examples. The baseline example is marked by the reference AFNB; the example of FIG. 5 is marked by the reference AFFig5; the example of FIG. 6 is marked by the reference AFFig6; the example of FIG. 7 is marked by the reference AFFig7; and the example of FIG. 8 is marked by the reference AFFig8.

These comparisons show that the examples of FIG. 5, FIG. 6, and FIG. 8 are to be preferred with the latter being the most preferred.

Figure 13:
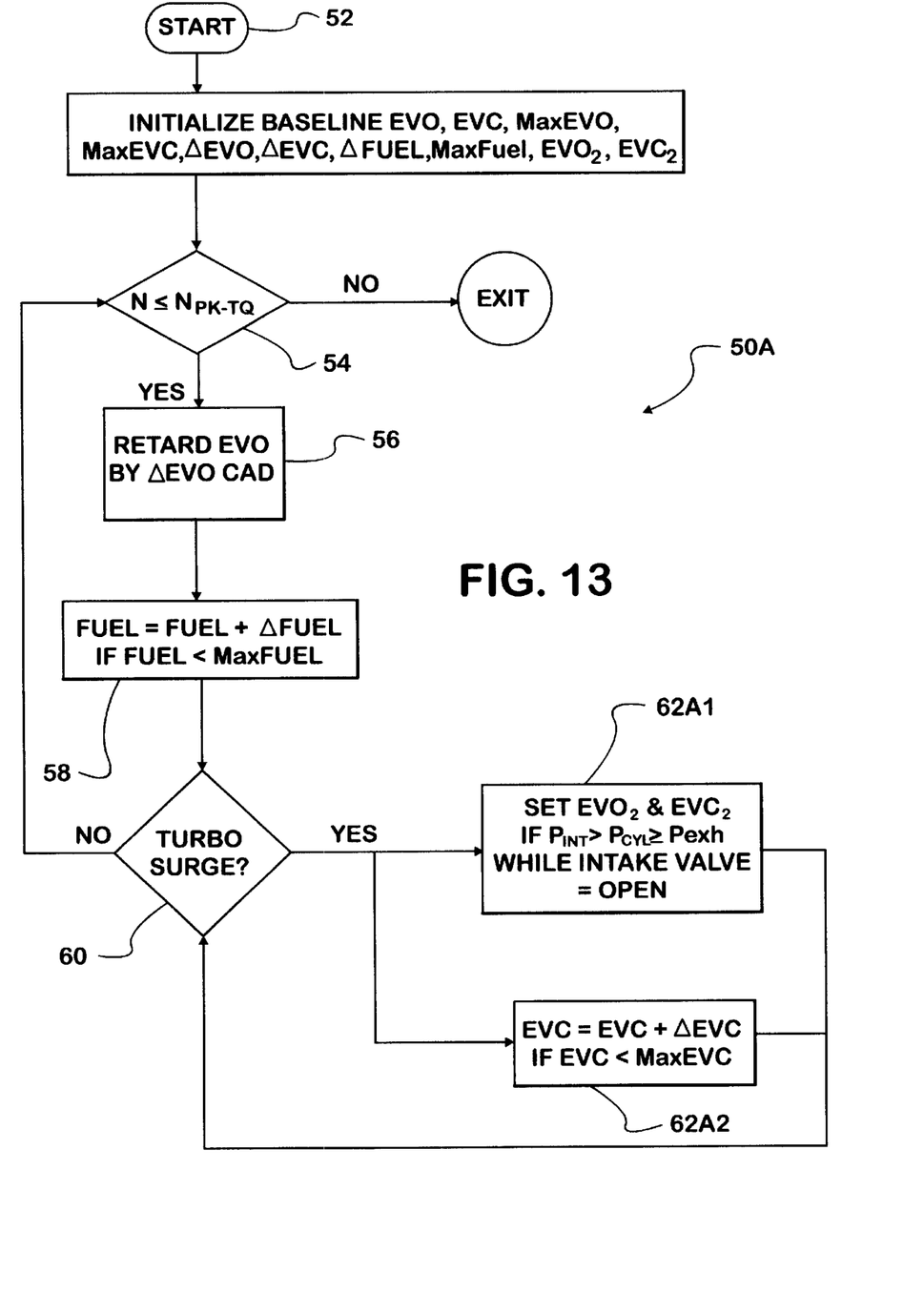
FIG. 13 is a flow diagram similar to FIG. 2 used in performing valve timing like that of the example of FIG. 8.

FIG. 13 shows an algorithm 50A similar in many respects to algorithm 50. Like steps in both algorithms are identified by like references numerals. Algorithm 50A is particularly adapted for the example of FIG. 8 where through-bleeding is accomplished by exhaust valve re-opening 122S. Step 56 retards the closing of the primary opening 122P by an increment ΔEVO, and step 58 increments fueling in an amount Δfuel consistent with the retarding increment. So long incipient compressor surging does not occur as determined by step 60, and so long as the fueling does not exceed a maximum limit MaxFuel, the algorithm will continue to increment both parameters.

If incipient surging is detected, then a step 62A1 initiates exhaust valve re-opening 122S. The timing of the beginning of re-opening EVO2 is selected to avoid backflow, i.e. re-opening to occur after portion 150 of the cycle. The timing of the end of re-opening EVC2 is selected to assure that the exhaust valve closes before the intake valve closes. These times may be adjusted for different engine operating conditions such as engine speed. The re-opening 122S should counter the incipient compressor surging to an extent that will allow the closing of the primary opening 122P to be further retarded and fueling incremented (steps 56 and 58) once step 60 ceases to detect incipient surging.

If incipient surging is again detected after exhaust valve re-opening has been initiated, the value of EVC2 is incremented (step 62A2) to make the re-opening longer. The value of EVC2 is limited however to a maximum MaxEVC to avoid the exhaust valve being still open when the intake valve closes.

While a presently preferred embodiment of the invention has been illustrated and described, it should be appreciated that principles of the invention are applicable to all embodiments and uses that fall within the scope of the following claims.

What is claimed is:

1. An internal combustion engine comprising:
   an intake system through which charge air is delivered to an intake manifold of the engine, including a turbocharger that comprises a compressor operated by exhaust gases from the engine for delivering compressed charge air into the intake manifold;
   intake valves that are normally closed but open at times during engine operating cycles to allow charge air to enter combustion chambers of the engine from the intake manifold;
   exhaust valves that are normally closed but open at times during engine operating cycles to allow the exhaust gases to exit the combustion chambers;
   a control for controlling the opening of the exhaust valves in relation to engine operating cycles and for controlling fueling of the engine in relation to engine operating cycles;
   wherein, at times, the control further retards the opening of the exhaust valve opening during engine operating cycles to cause the turbocharger to increase pressure in the intake manifold, increases engine fueling in relation to the increased pressure in the intake manifold, and in response to any incipient surging of the compressor resulting from such further retarded exhaust valve opening and such increased engine fueling, causes the exhaust valves to be open, during at least some portion of the time that the intake valves are open, for bleeding a sufficient amount of charge air through the combustion chambers to the exhaust system to counteract incipient compressor surging.

2. An internal combustion engine as set forth in claim 1 in which the engine operating cycle comprises a compression ignition operating cycle.

3. An internal combustion engine as set forth in claim 1 in which the control operates according to an algorithm that increases the retarding of exhaust valve opening by a certain number of degrees in the engine operating cycle and that increases engine fueling by some amount if the compressor did not begin to surge in response to the increased retarding of exhaust valve opening.

4. An internal combustion engine as set forth in claim 3 in which the algorithm further increases the engine fueling in an even greater amount if the compressor did not begin to surge in response to the previously increased fueling.

5. An internal combustion engine as set forth in claim 4 in which the algorithm operates to cause increased bleeding of charge air if the compressor began to surge in response to the further increase in engine fueling.

6. An internal combustion engine as set forth in claim 5 in which the algorithm operates to cause increased bleeding of charge air until cessation of any compressor surging that began in response to the further increase in engine fueling.

7. An internal combustion engine as set forth in claim 1 in which the control causes the exhaust valves to open during exhaust portions of engine operating cycles for exhausting exhaust gases from the combustion chambers, and for counteracting incipient compressor surging, the control further causes the closing of the open exhaust valves to be delayed until a time later than initial opening of the intake valves during the engine operating cycle.

8. An internal combustion engine as set forth in claim 7 in which the control initiates the delay in exhaust valve closing as the exhaust valves are in the process of closing.

9. An internal combustion engine as set forth in claim 8 in which the control causes the exhaust valves to remain open with predetermined lift while their closing is being delayed.

10. An internal combustion engine as set forth in claim 7 in which the control causes the exhaust valves to remain open until the intake valves are in the process of closing.

11. An internal combustion engine as set forth in claim 10 in which the control causes the exhaust valves to remain open with predetermined lift while their closing is being delayed.

12. A method of operating an internal combustion engine that comprises:
   an intake system through which charge air is delivered to an intake manifold of the engine, including a turbocharger that comprises a compressor operated by exhaust gases from the engine for delivering compressed charge air into the intake manifold;
   intake valves that are normally closed but open at times during engine operating cycles to allow charge air to enter combustion chambers of the engine from the intake manifold; and
   exhaust valves that are normally closed but open at times during engine operating cycles to allow the exhaust gases to exit the combustion chambers;
   the method comprising:
      at times, further retarding exhaust valve opening in relation to the engine operating cycle to cause the turbocharger to increase pressure in the intake manifold, increasing engine fueling in relation to the increased pressure in the intake manifold, and in response to any incipient surging of the compressor resulting from such further retarded exhaust valve opening and such increased engine fueling, causing the exhaust valves to be open to a sufficient extent, during at least some portion of the time that the intake valves are open, for bleeding a sufficient amount of charge air through the combustion chambers to the exhaust system to counteract incipient compressor surging.

13. A method set forth in claim 12 in which the engine operating cycle comprises a compression ignition operating cycle, the step of further retarding exhaust valve opening in relation to the engine operating cycle to cause the turbocharger to increase pressure in the intake manifold comprises increasing the retarding of exhaust valve opening by a certain number of degrees in the engine operating cycle, and the step of increasing engine fueling in accordance with the increased pressure in the intake manifold comprises increasing engine fueling by some amount if the compressor did not begin to surge in response to the increased retarding of exhaust valve opening.

14. A method as set forth in claim 13 including the step of further increasing the engine fueling in an even greater amount if the compressor did not begin to surge in response to the previously increased fueling.

15. A method as set forth in claim 14 including the step of increasing the bleeding of charge air if the compressor began to surge in response to the further increase in engine fueling.

16. A method as set forth in claim 12 in which the step of increasing the bleeding of charge air if the compressor began to surge in response to the further increase in engine fueling comprises increasing bleeding of charge air until cessation of any compressor surging that began in response to the further increase in engine fueling.

17. A method as set forth in claim 12 including the step of causing the exhaust valves to open during exhaust portions of engine operating cycles for exhausting exhaust gases from the combustion chambers, and for counteracting incipient compressor surging, causing the closing of the open exhaust valves to be delayed until a time later than initial opening of the intake valves during the engine operating cycle.

18. A method as set forth in claim 17 in which the step of causing the closing of the open exhaust valves to be delayed until a time later than initial opening of the intake valves during the engine operating cycle comprises initiating the delay in exhaust valve closing as the exhaust valves are in the process of closing.

19. A method as set forth in claim 18 in which the step of causing the closing of the open exhaust valves to be delayed until a time later than initial opening of the intake valves during the engine operating cycle comprises causing the exhaust valves to remain open with predetermined lift while their closing is being delayed.

20. A method as set forth in claim 17 including the step of causing the exhaust valves to remain open until the intake valves are in the process of closing.

21. A method as set forth in claim 20 in which the step of causing the closing of the open exhaust valves to be delayed until a time later than initial opening of the intake valves during the engine operating cycle comprises causing the exhaust valves to remain open with predetermined lift while their closing is being delayed.

* * * * *